J. S. WORTH & W. F. HARRISON.
ROLLING MILL TUBE TROUGH.
APPLICATION FILED APR. 4, 1906.
931,543.
Patented Aug. 17, 1909.
3 SHEETS—SHEET 2.
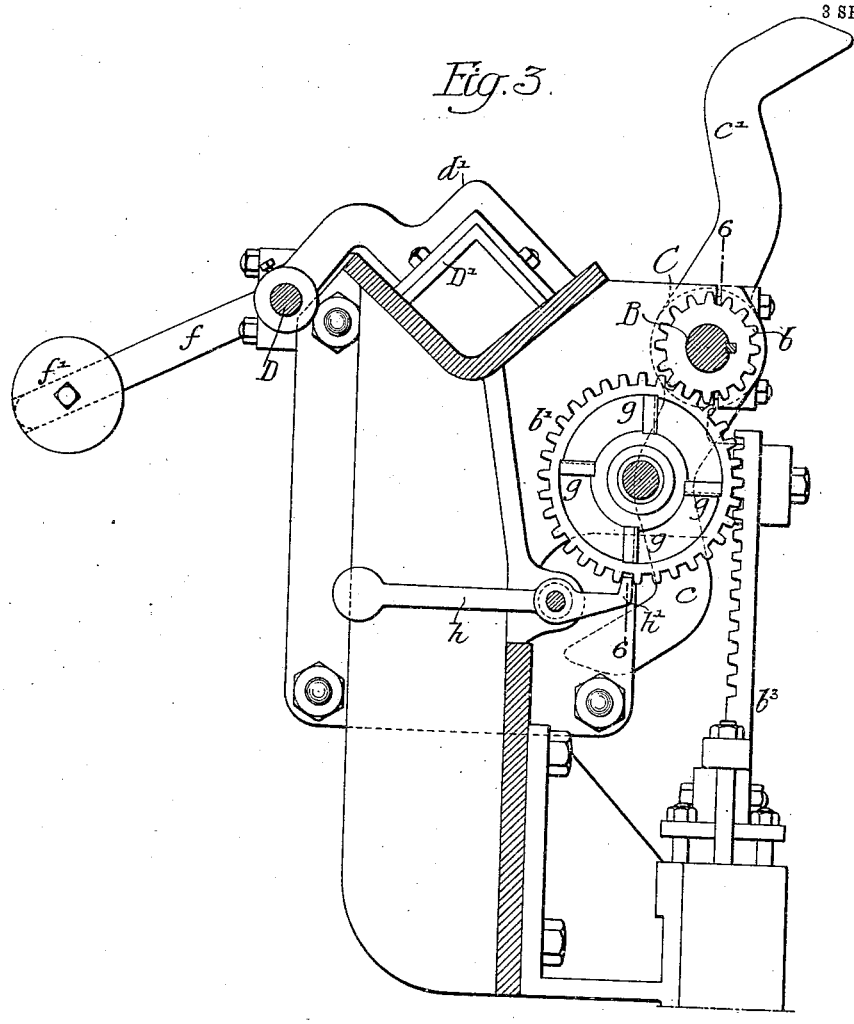
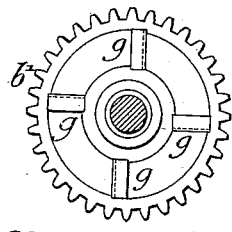
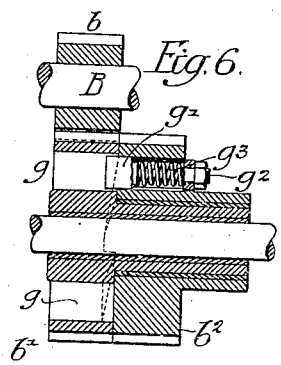
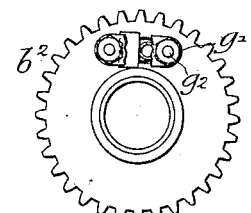

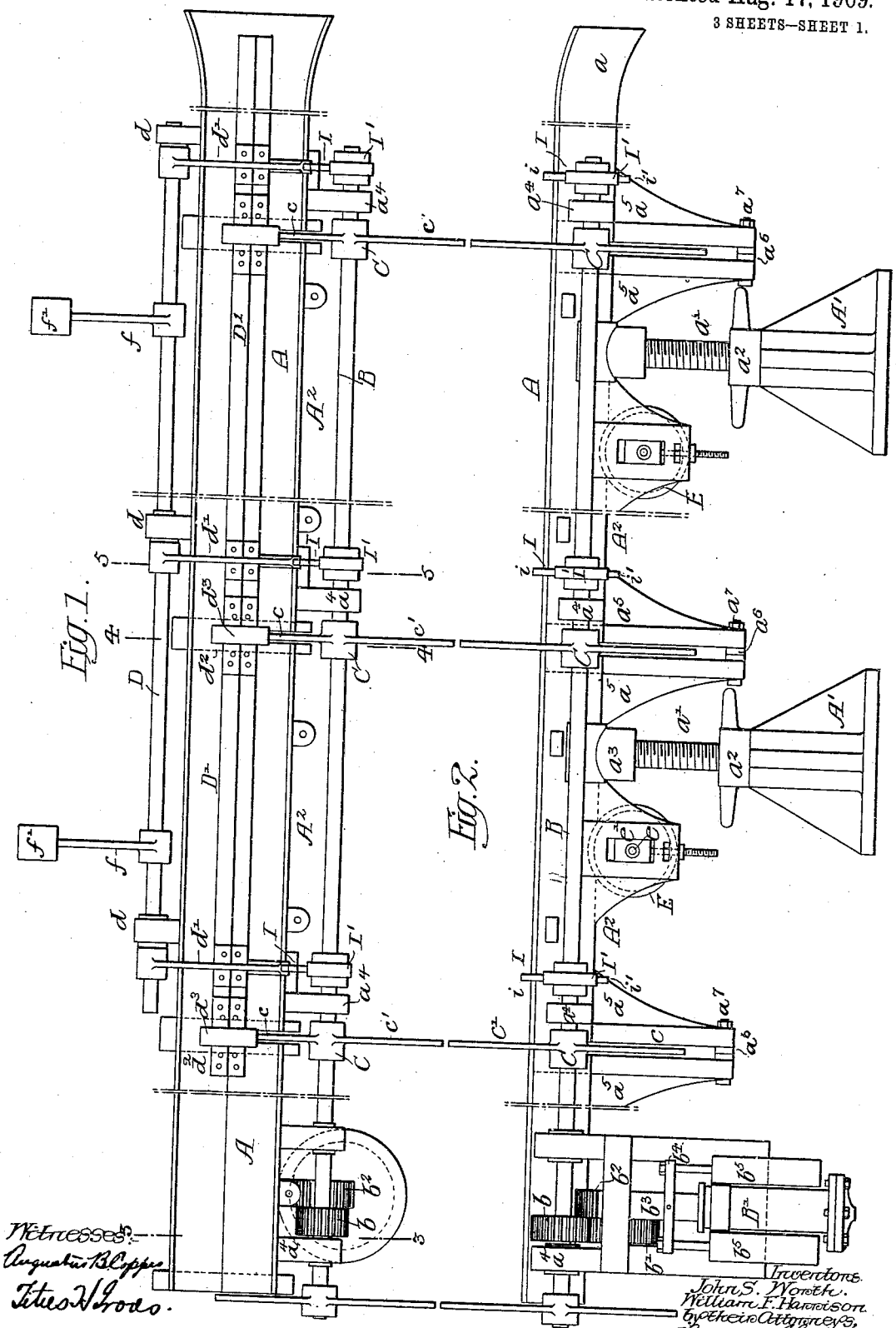

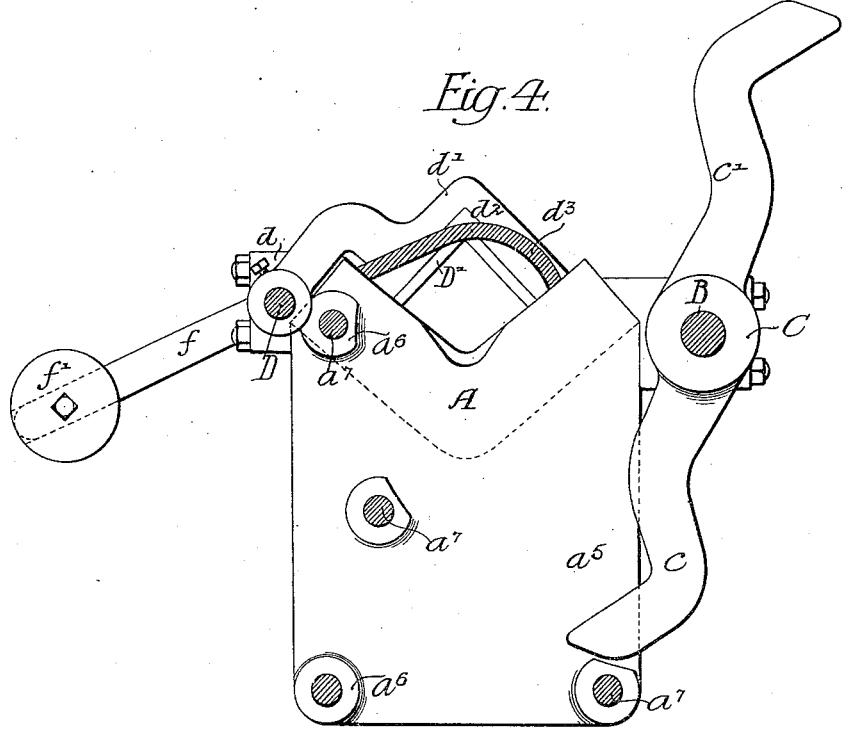
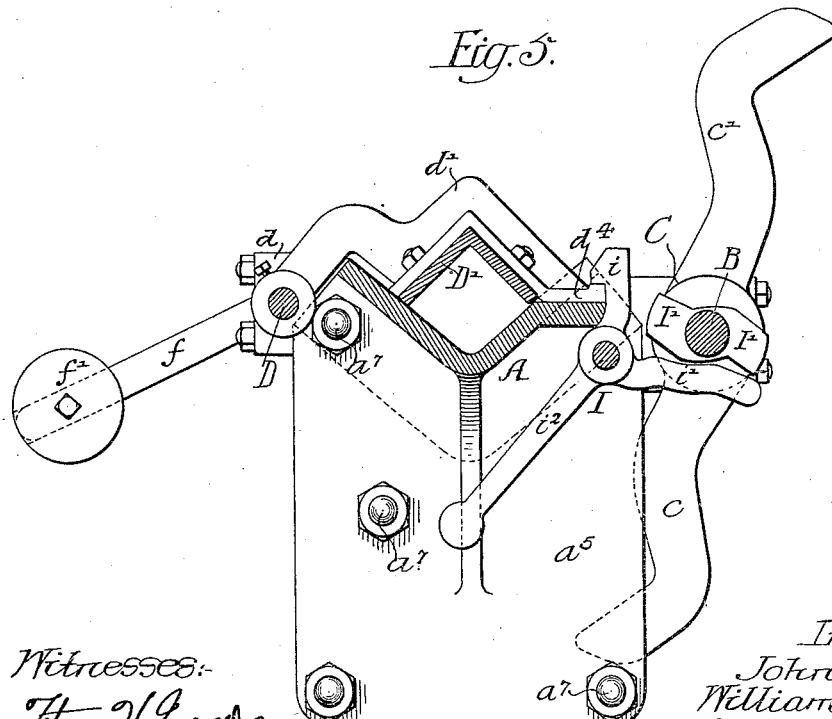

UNITED STATES PATENT OFFICE.

JOHN S. WORTH AND WILLIAM F. HARRISON, OF COATESVILLE, PENNSYLVANIA, ASSIGNORS TO JOHN S. WORTH AND WILLIAM P. WORTH, OF COATESVILLE, PENNSYLVANIA.

ROLLING-MILL TUBE-TROUGH.

No. 931,543.

Specification of Letters Patent.

Patented Aug. 17, 1909.

Application filed April 4, 1906. Serial No. 309,859.

*To all whom it may concern:*

Be it known that we, JOHN S. WORTH and WILLIAM F. HARRISON, citizens of the United States, residing in Coatesville, Pennsylvania, have invented certain Improvements in Rolling-Mill Tube-Troughs, of which the following is a specification.

Our invention relates to certain improvements in troughs to receive a tube as it comes from the rolls of a tube mill.

The object of our invention is to provide means for quickly removing the tube from the trough, and also to provide means for preventing the tube from buckling as it enters the trough. This object we attain in the manner hereinafter set forth, reference being had to the accompanying drawings, in which:—

Figure 1, is a plan view of a trough illustrating our improvements; Fig. 2, is a side view of Fig. 1; Fig. 3, is a transverse sectional view on the line 3—3, Fig. 1; Fig. 4, is a transverse sectional view on the line 4—4, Fig. 1; Fig. 5, is a transverse sectional view on the line 5—5, Fig. 1; Fig. 6, is a sectional view on the line 6—6, Fig. 3; Fig. 7, is a face view of one of the gear wheels shown in Fig. 6; Fig. 8, is a face view of the other gear wheel shown in Fig. 6.

A is a trough having what may be termed a bell end $a$ to receive the tube from the rolls of the tube mill. The bent tube or tube blank is heated and then passed through the welding rolls and directly into the trough, although it will be understood that our invention may be used in connection with any trough for receiving a tube or bar where it is desired to quickly remove the tube or bar from the trough.

The trough in the present instance is V-shaped, as shown in the sectional views, and is supported on standards $A'$, into which extend screw threaded stems $a'$, and on the standards are nuts $a^2$. The stems have Y-shaped heads $a^3$ in which the trough rests. By turning the nuts $a^2$ the trough can be adjusted vertically to any height desired.

Extending longitudinally along one side of the trough is a shaft B which is mounted in suitable bearings $a^4$ projecting from the trough, and has a gear wheel $b$ at one end which meshes with a gear wheel $b'$ connected to a gear wheel $b^2$ by ratchet mechanism described hereinafter. A rack $b^3$ meshes with this gear wheel $b^2$ and the rack is carried by the ram of the hydraulic cylinder $B'$, so that when the ram is projected the shaft B will turn a given distance, the ram returning to its normal position, the ratchet mechanism allowing for its return without turning the shaft B. On the ram is a cross head $b^4$ from which are suspended weights $b^5$ which return the ram after the fluid has been exhausted from the cylinder.

On the shaft is a series of hubs C each having, in this case, two arms $c$, $c'$, curved as clearly shown in Fig. 4 and shaped so as to engage the tube. The driving mechanism is so geared that the shaft will make a half turn, so that the arms in making the half turn will pick the tube out of the trough and deliver it onto rails or a table at the side of the trough.

In order to allow the arms to pass through the trough we make the trough A in sections, as clearly shown in Fig. 2, each section $A^2$ having depending portions $a^5$ which are spaced apart by lugs $a^6$ so as to form a slot through which the arms can pass. The several sections are secured together by bolts $a^7$. The slots are of such a width as not to interfere with the free passage of the tube into the trough, and we preferably arrange a series of rollers E which project into the trough and support the tube as it passes into the trough. The trunnions $e$ of these rollers are mounted in adjustable bearings $e'$. The rollers are not absolutely necessary but are preferable. Thus it will be seen that after a tube has been projected into the trough the mechanism for turning the shaft B is set in motion and the shaft is turned a half revolution, the arms $c$ passing through the slots in the trough will lift the tube out of the trough, the arms being spaced a sufficient distance apart so as to prevent the tube bending, and as the arm moves around to the predetermined position it will discharge the tube at one side of the trough.

Any number of arms may be used on the hubs, if one arm is used then the mechanism is so constructed that the arm will make a full revolution every time, if two a one-half revolution, if three a one-third revolution, and so on. The extent of movement is regulated by the gears used.

One advantage of constructing the machine so that the arms will have a continued forward movement is that the arms cannot be struck by the next tube entering the trough. If the mechanism was so constructed that the arm would have to return in the same path it is liable, on its return movement, to come into the path of a tube entering the trough. Usually rails are provided to receive the tube and allow it to roll onto a truck or other carrier.

While we have shown a continued forward movement of the lifting arms by revolving them in order to prevent them regaining their original position by being moved backward across the path of the next advancing tube, this may be accomplished by moving the arm back to the original position by any route which will avoid crossing the path of the tube.

We have shown in Figs. 1 and 2 hydraulic mechanism for turning the arms for removing the tubes from the trough, but it will be understood that any suitable mechanism may be provided for imparting motion to the shaft. In order to prevent the tube or mandrel over which it is forced from buckling as it passes into the trough, we mount a shaft D at the side of the trough. This shaft is mounted in suitable bearings $d$, and secured to the shaft is a series of arms $d'$ which are flanged, as shown, and secured to the flanges is a V-shaped guard D'. This guard is preferably made of angle iron and is made in sections, the sections being united by flanged couplings $d^2$. These couplings are shaped as clearly shown in Fig. 4, forming a cam face $d^3$ and the couplings are directly over the slots in the trough so that when the shaft B is turned the arms will strike the cam face $d^3$ of the couplings and lift the guard so that the tube can be readily removed from the trough without coming in contact with the guard. As soon as the arms $c$ or $c'$ leave the cam faces $d^3$ of the guard it will fall back to its original position. In order to balance a portion of the weight of the guard we provide arms $f\,f$, with weights $f'$, so that as soon as the guard is released it will gently fall back to its original position. The guard is locked so as to prevent the tube lifting it when it is driven into the trough and, in the present instance, we provide a series of latches I, Fig. 5. Each latch has three arms $i, i', i^2$; the arm $i$ is the latch proper and engages a projection $d^4$ on the guard, $i'$ is the tappet arm which is in the path of the cams I' secured to the shaft B, and $i^2$ is the weighted arm to return the latch to its normal position. The head of the arm $i$ is beveled so that when the guard is returned after being raised by the arms $c, c'$, it will push back the latch I and the arms of the latch will lock it in a fixed position until the cams I' again act upon the latch to release the guard. It will be noticed that the cams are so set that the guard is released just in advance of the arm $c$ or $c'$ coming in contact with the guard.

We will now describe the details of the mechanism for imparting an intermittent motion to the shaft B. As shown clearly in Figs. 6, 7 and 8, the gear wheel $b'$ has a long hub upon which is mounted the gear wheel $b^2$, and the gear wheel $b'$ has a series of teeth $g$, spaced in the present instance as shown clearly in Fig. 7, and these teeth are beveled at one side and are abrupt on the other side. Carried by the gear wheel $b^2$ is a pawl $g'$ mounted on a stem $g^2$, and surrounding the stem is a coiled spring $g^3$, the pawl is beveled on one side so that it will engage the ratchet teeth $g$ when going forward, and slip past the ratchet teeth in returning. By this means the plunger to which the rack is secured can reciprocate the wheel $b^2$, but the wheel $b'$ will turn a quarter turn in one direction only. In order to lock the wheel we preferably mount on the frame of the trough a lever $h$, Fig. 3, having an arm $h'$ turned up to engage one of the teeth of the wheel $b'$, and the arm is beveled so that it will allow the wheel to turn freely in one direction but will prevent it turning backward in case there should be sufficient friction tending to return the wheel $b'$ with the wheel $b^2$.

While our invention is especially applicable for use in connection with the welding rolls of a tube mill where it is desired to quickly remove tubes from the trough so that the output can be increased, it will be understood that the invention can be used at other points in the tube mill, or in connection with the manufacture of bars or other shapes, without departing from our invention.

We claim:—

1. The combination of a trough having a series of slots extending into it from one side, a longitudinal shaft on that side of the trough having said slots, arms mounted on the shaft and adapted to extend into the slots of the trough, said arms being shaped to lift a tube out of the trough and cause it to roll upon them as ways to one side of said trough, with means for rotating the shaft.

2. A tube trough made up of a series of sections, said sections being spaced apart to form slots, longitudinal bolts securing the several sections together, and means operable in the slots for removing the tube from the trough.

3. The combination of a trough made in sections spaced apart, each section having depending portions at each end, longitudinal bolts securing the depending portions together, and means operable in the slots for removing the tube, the bolts being so situated as to not interfere with the passage of the said means.

4. The combination of a trough having transverse slots, with a guard movably mounted on the trough, a series of lifting arms adapted to move through the slots, said arms and guard having inter-engaging portions so arranged that the arms will engage and lift the guard before the arms pass the lower inner supporting portion of the trough, substantially as described.

5. The combination in a trough, of a guard mounted in the trough, a series of arms secured to the guard, a shaft at one side of the trough on which the arms are mounted, a cam face on the guard, an arm pivoted to the opposite side of the trough and so situated that when it is turned it will come in contact with the cam face and lift the guard so that it can, on a further movement, remove a tube from the trough, substantially as described.

In testimony whereof, we have signed our names to this specification, in the presence of two subscribing witnesses.

JOHN S. WORTH.
WILLIAM F. HARRISON.

Witnesses:
S. G. Cook,
William S. G. Cook.